(12) United States Patent
Evans et al.

(10) Patent No.: US 8,741,143 B2
(45) Date of Patent: Jun. 3, 2014

(54) PROCESS AND PLANT FOR TREATING A WATER STREAM

(75) Inventors: David Evans, Taralgon (AU); Andrew Hodgkinson, Melbourne (AU)

(73) Assignee: Central Gippsland Region Water Corporation, Traralgon (AU)

( * ) Notice: Subject to any disclaimer, the term of this patent is extended or adjusted under 35 U.S.C. 154(b) by 0 days.

(21) Appl. No.: 12/866,923

(22) PCT Filed: Dec. 22, 2008

(86) PCT No.: PCT/AU2008/001885
§ 371 (c)(1),
(2), (4) Date: Feb. 25, 2011

(87) PCT Pub. No.: WO2010/037156
PCT Pub. Date: Apr. 8, 2010

(65) Prior Publication Data
US 2012/0085701 A1   Apr. 12, 2012

(30) Foreign Application Priority Data
Sep. 30, 2008   (AU) ................................ 2008905081

(51) Int. Cl.
*C02F 9/00* (2006.01)
*C02F 3/30* (2006.01)
*B01D 35/06* (2006.01)

(52) U.S. Cl.
USPC ........... 210/631; 210/605; 210/630; 210/638; 210/652; 210/695

(58) Field of Classification Search
None
See application file for complete search history.

(56) References Cited

U.S. PATENT DOCUMENTS

| | | | |
|---|---|---|---|
| 5,200,089 A * | 4/1993 | Siefert et al. ................... | 210/725 |
| 5,529,697 A | 6/1996 | Braasch et al. | |
| 6,033,568 A * | 3/2000 | Kaplan ......................... | 210/602 |
| 6,896,806 B2 | 5/2005 | Kumar et al. | |
| 2002/0153303 A1* | 10/2002 | Oswald et al. ................. | 210/603 |
| 2003/0141250 A1* | 7/2003 | Kihara et al. .................. | 210/652 |

(Continued)

FOREIGN PATENT DOCUMENTS

| | | |
|---|---|---|
| CN | 1772649 A | 5/2006 |
| CN | 2910906 Y | 6/2007 |

(Continued)

OTHER PUBLICATIONS

Ostarcevic, Eddy; "Colour Removal Without Chemical Addition Using Nanofiltration"; Sep. 5 to 7, 2006; 69th Annual Water Industry Engineers and Operators Conference; pp. 103, 104, 105, 108, 111.*

(Continued)

*Primary Examiner* — Nam Nguyen
*Assistant Examiner* — Richard Gurtowski
(74) *Attorney, Agent, or Firm* — Cooley LLP

(57) ABSTRACT

A process for treating a water stream containing dissolved organic carbon and dissolved salts comprises subjecting the water stream to reverse osmosis after a pre-treatment step to reduce the amount of dissolved organic carbon directed in water to the reverse osmosis treatment step. The preferred pre-treatment step is a membrane treatment step such as nanofiltration. The process enables treatment of complex effluents including mixtures of domestic and industrial effluents. Treated water may be recycled and a treatment plant (100) employing the process forms another aspect of the invention.

23 Claims, 2 Drawing Sheets

(56) References Cited

U.S. PATENT DOCUMENTS

Figure 1:
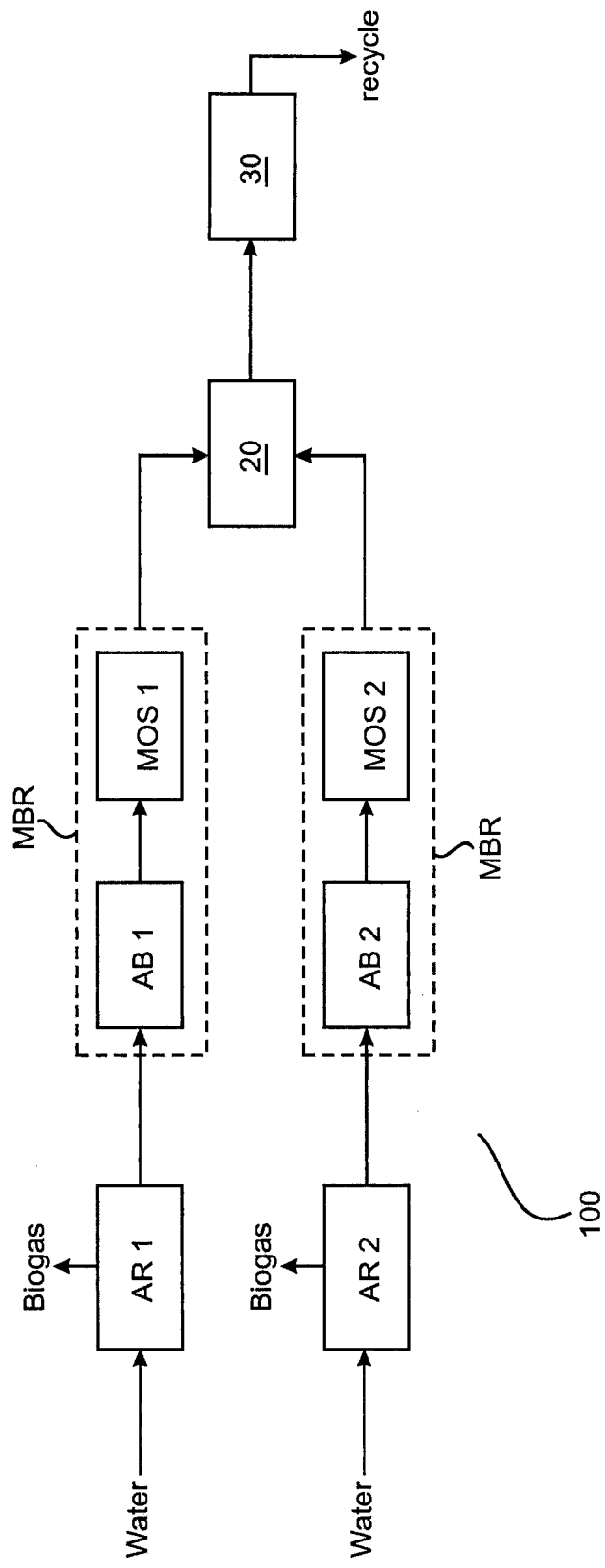

| | | |
|---|---|---|
| 2004/0140266 A1 | 7/2004 | Nguyen et al. |
| 2004/0222158 A1* | 11/2004 | Husain et al. ............... 210/651 |
| 2006/0060525 A1* | 3/2006 | Hoffland ..................... 210/603 |
| 2007/0039895 A1* | 2/2007 | Sengupta et al. ............ 210/723 |

FOREIGN PATENT DOCUMENTS

| | | | |
|---|---|---|---|
| CN | 200978232 Y | | 11/2007 |
| CN | 101088941 | * | 12/2007 |
| CN | 101249992 A | | 8/2008 |
| DE | 10004590 A1 | | 5/2001 |
| EP | 1614661 A1 | | 1/2006 |
| EP | 1734013 A2 | | 12/2006 |
| GB | 2394678 A | | 5/2004 |
| KR | 20070118055 A | | 12/2007 |
| WO | WO-9208783 A1 | | 5/1992 |
| WO | WO-9916714 A1 | | 4/1999 |
| WO | WO-2005123603 A1 | | 12/2005 |

OTHER PUBLICATIONS

Bartels et al. "Chemically Tolerant NF Membranes for Aggressive Industrial Applications." *Hydraulics*. (2006).

* cited by examiner

PROCESS AND PLANT FOR TREATING A WATER STREAM

CROSS-REFERENCE TO RELATED APPLICATIONS

The present application claims priority to International Application No. PCT/AU2008/001885(PCT Publication No. WO 2010/037156), filed Dec. 22, 2008 and entitled "PROCESS AND PLANT FOR TREATING A WATER STREAM," which claims priority to Australian Patent Application No. 2008905081, filed Sep. 30, 2008, the contents of all of which are hereby incorporated by reference in their entireties.

This invention relates to a process and plant for treating a water stream containing dissolved organic carbon and dissolved salts.

Many water streams contain dissolved organic carbon in the form of compounds which may act as colouring agents making water unsatisfactory for use, recycle or disposal. A water stream of significant concern is effluent arising from pulp and paper mills. The pulp and paper industry produces a large volume of wastewater which presents both a cost to operations and, potentially, the environment if not properly treated. Accordingly, treatment of effluent from this industry has received great consideration and investigation.

Typically, pulp and paper mill effluent is highly coloured and a brownish colouration is typical. U.S. Pat. No. 6,896,806 observes that the brownish colour of the effluent is mainly organic in nature being primarily attributable to dissolved organic carbon in the form of lignin degradation products formed during various pulping and bleaching operations. The other colour imparting agents are wood extracts, tannins, resins and—possibly—synthetic dyes. Such effluents can also be high in sulfate ion concentration.

Several possible treatment strategies for such effluents have been proposed though it is not possible to easily identify a most effective treatment technology, particularly as most proposed technologies have significant economic impacts.

U.S. Pat. No. 5,529,697 examines a number of options for treatment of pulp and paper effluents considering—in particular—the use of oxidants such as ozone and hydrogen peroxide. Hydrogen peroxide requires a very long contact time for effective removal of colour. Ozone has also been considered but has a high expense and energy intensity.

U.S. Pat. No. 5,529,697 also observes that the processes of reverse osmosis and electrodialysis have been studied as potential techniques to remove colour from spent liquors from pulp mill operations. Reverse osmosis, however, has been primarily used in desalination of waters for the production of potable water. Removal of organic contaminants by reverse osmosis has been found to be prone to several types of fouling, making it ineffective to remove the organics. Further issues, as identified in U.S. Pat. No. 5,529,697, include possible problems arising from the fragile nature of the membranes and the costs associated with the operation of a filtration system capable of handling large volumes of water.

It is the object of the present invention to provide a process for treating a water stream which enables satisfactory removal of dissolved organic carbon and colour from an effluent stream, not necessarily confined to pulp and paper industry effluent.

With this object in view, the present invention provides a process for treating a water stream containing dissolved organic carbon and dissolved salts comprising subjecting the water stream to a reverse osmosis treatment step to produce a treated water stream wherein, prior to treatment of water in the reverse osmosis step, the water stream is treated in at least one pre-treatment step to reduce the amount of dissolved organic carbon directed in water to the reverse osmosis step.

The pre-treatment step is directed at lowering the concentration of dissolved organic carbon ("DOC"), particularly in the form of lignin compounds or lignin derived compounds, in the water stream directed to the reverse osmosis step, which cause organic and microbiological fouling of the membranes used in that step. In particular, the strongly coloured lignin compounds also have a high chlorine demand (about 1-2 mg chlorine demand per 1 mg of DOC) which, in practice, prevents use of normal reverse osmosis biofouling protective measures such as treatment with chloramines. Therefore, reducing the risk of fouling, substantially or completely, is important to use of the reverse osmosis process for final treatment of water primarily for removal of dissolved salts (desalination). A suite of possible processes could be used in the pre-treatment step including oxidation, a variety of ion exchange methods including magnetic ion exchange and use of coagulants. However, after investigation, limitations have been identified with several of them. The costs of oxidation using ozone, hydrogen peroxide and other oxidant processes were found prohibitive for large water volumes. Use of coagulants results in production of volumes of sludge which are excessive, presenting handling and disposal problems.

The preferred pre-treatment step is therefore a counterintuitive but additional intervening membrane treatment step advantageously involving nanofiltration. While nanofiltration is a similar process to reverse osmosis ("RO"), there are differences. The main difference is that nanofiltration membranes are slightly more "open" than RO membranes. This means that small, monovalent ions (e.g sodium and chloride) are not well rejected by nanofiltration membranes, while multivalent ions (e.g sulfate) are moderately rejected. Nanofiltration membranes can also have specialized surface physical effects that allow selective separation for some species. Rejection of DOC up to 99% can be achieved. Recovery of DOC from pulp and paper effluents may be limited to 85% above which unacceptable organic fouling of membranes may take place. Nanofiltration may be conducted in a number of stages.

A further pre-treatment process may involve an anaerobic process, but particularly an anaerobic process involving a membrane reactor, such as a membrane bioreactor ("MBR") which allows removal of only a small portion of DOC because removal of DOC is predominantly intractable to anaerobic and aerobic microbial digestion processes. Such DOC may be referred to as biorefractory DOC ("rDOC") and typically comprises low molecular weight compounds. Filtrate or permeate from the MBR(s), containing such biorefractory DOC, is therefore not suitable for direction straight to the RO desalination process stage because of the practically insurmountable fouling problems discussed above. However, such a process may be used in addition to nanofiltration or other intermediate treatment steps. Indeed, the combination of anaerobic digestion process, MBR, intermediate process and reverse osmosis allows treatment of a suite of possible wastewater streams and allows a plant operating the water treatment process of the invention to treat both domestic wastewater streams (such as sewage streams which have low refractory colour), industrial wastewater streams and combinations of domestic and industrial wastewater streams using an advanced water treatment strategy. An industrial water stream may be a stream from a pulp or paper mill.

Concentrates from nanofiltration and reverse osmosis steps may be subjected to treatment with coagulants or oxidants as volumes of sludge and costs for treatment of concentrates are within acceptable limits from handling and economic points of view. Other concentrate treatment methods also feasible include another membrane treatment step, such as a nanofiltration step, or a range of ion exchange methods including magnetic ion exchange.

The use of a pre-treatment step for removal of dissolved organic carbon and colour may enable effective colour removal and the possibility of recycling desalinated, decolourised water to an industrial plant, such as a pulp or paper mill, or other application with economic benefit.

In a further aspect, the present invention provides a water treatment plant for treating a water stream containing dissolved organic carbon and dissolved salts comprising:
(a) a reverse osmosis stage; and
(b) at least one pre-treatment stage for pre-treating water to be directed to the reverse osmosis stage
wherein the pre-treatment stage reduces the concentration of dissolved organic carbon in water directed to the reverse osmosis stage.

The advantages of the water treatment process and plant of the present invention include the following:
(a) following removal of the bulk of biorefractory dissolved organic carbon, a reverse osmosis stage may be used for final desalination treatment of water without undue measures being taken to avoid fouling or reduce the rate of fouling to an acceptable level. In particular, conventional anti-fouling treatments may be adopted.
(b) biorefractory dissolved organic carbon concentration and colour may be reduced in an economic manner enabling potential recycle of treated water to an application requiring it.
(c) the process may be adapted to treatment of combined industrial/domestic waste water streams even where the industrial waste water has a high dissolved organic carbon concentration and high colour contrasting to the characteristics of the domestic waste water stream.

Figure 2:
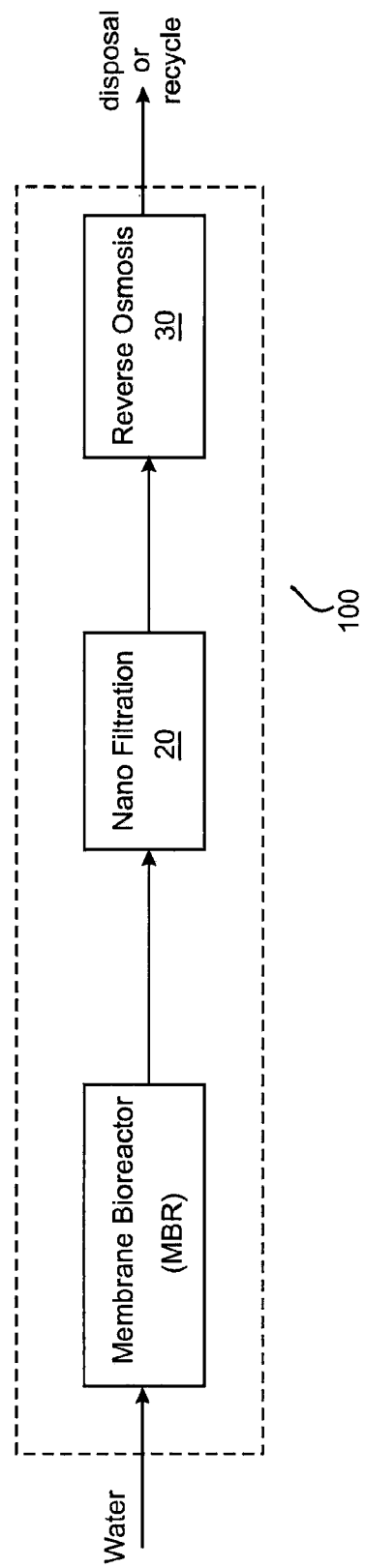

The water treatment process and plant of the present invention may be more fully understood from the following description of a preferred embodiment thereof made with reference to the accompanying drawings in which:

FIG. 1 is a schematic process flowsheet for a water treatment plant operated in accordance with one embodiment of the process of the present invention; and FIG. 2 is a block diagram showing the process units involved in the process flowsheet of FIG. 1.

Referring now to FIG. 1, there is shown a water treatment plant 100 comprising two anaerobic reactors (AR1 and AR2) to produce treated water and biogas. AR1 and AR2 supply pre-treated influent water to aeration basins and membrane bioreactor ("MBR") systems (AB1/MOS1 and AB2/MOS2). The anaerobic reactors treat raw influent water which is a combination of domestic effluent and industrial effluent received from a Kraft process pulp and paper mill through a dedicated waste line through a digestion process.

Anaerobic digestion, by microbes, is assisted by addition of a microbial nutrient mixture such as from a sludge stream such as activated sludge or primary sludge. Sufficient nutrient should be present to provide a healthy biomass and acceptable biological digestion to reduce degradeable organic carbon (often also referred to as biochemical oxygen demand ("BOD")) to satisfactory levels. Gross chemical oxygen demand ("COD") across reactors AR1 and AR2, which operate in parallel, is around 25-30%. However, the influent constituent organics include a significant fraction—dissolved organic carbon ("DOC") fraction—which provides a strong brown colouration to the influent water. Measured in Pt/Co colour units, colour may vary in the range 500 to 8000 colour units. This DOC fraction—comprising lignin degradation products—is, for the most part, refractory to biological digestion and filtration though a measurable but insufficient degree of removal of colour does take place in the MBR systems. The waste is also saline containing high levels of sulfate and conversion of degradable organics through sulfate reduction (forming sulfide) means that the removal of degradable organics is actually in the range 70-90% (as measured by COD).

The treated effluent from the anaerobic reactors AR1 and AR2 passes to the aeration basins AB1 and AB2 respectively. These basins provide aerobic digestion conditions to further treat the wastewater. The mixed liquor is recirculated from aeration basins AB1 and AB2 into ultrafiltration modules referred to as Membrane Operating Systems (MOS1 and MOS2). The MOS units contain a single Memcor® ultrafiltration module each which filters the mixed liquor to produce ultrafiltrate which has nearly undetectable levels of BOD. Each combined AB+MOS system comprises a membrane bioreactor ("MBR") and the ultrafiltrate may be referred to as MBR filtrate or permeate.

It was hoped that it would be possible to pass the MBR permeate directly to a reverse osmosis ("RO") desalination membrane unit to produce a high quality recycled water product that was low in salinity and organics. However, RO treatment cannot be conducted at practical recovery ratios due to heavy fouling caused by the biologically refractory or biorefractory dissolved organics ("rDOC") remaining in the MBR permeate which is, consequently, highly coloured. Further, the rDOC fraction has a very high chlorine demand potentially requiring well in excess of 100 mg/l—chlorine added to the water stream as anti-biofouling agent. This is an impractical quantity and poses the risk of formation of toxic organochlorine compounds. It is therefore very difficult to produce a biostatic feedwater (to prevent biofouling) for RO unless the rDOC is removed. However, recycle of water to the pulp and paper mill requires the removal of dissolved salts in water for which RO treatment is well suited.

Accordingly, the MBR permeate is subjected to a pre-treatment step before direction to the RO process unit. To this end, water treatment plant 100 comprises a nanofiltration process unit 20 for removing DOC from the MBR permeate to produce a water quality acceptable for feed to the RO process unit 30. The nanofiltration process unit 20 comprises a plurality of stages comprising spiral wound membrane elements contained within pressure vessels (housings). Three to six membrane elements are selected, all being connected in series inside a single housing. The nanofiltration unit stages are divided into groups called concentrate stages. In each concentrate stage, housings are connected in parallel with respect to the direction of the feed/concentrate flow. In order to further increase nanofiltration unit recovery, two or more concentrate stages are used, with the number of housings in each stage decreasing in the direction of the feed flow, in the ratio of about 2:1.

The membrane selected for the nanofiltration stage, after a testing process which excluded a number of candidates due to unacceptable fouling or DOC rejection, was a Filmtec™ NF 270 polyamide thin film composite membrane sourced from Dow Chemical Company.

An alternative membrane that may be used in the process is a HYDRACoRe sulfonated polyethersulfone ("SPES") membrane with a molecular weight cut-off around 1000 Daltons. This membrane is obtainable from Hydranautics. Further information about the membrane is available in the paper: Bartels et al., *Chemically Tolerant NF Membranes for Aggressive Industrial Applications*, Hydranautics, June 2006).

Use of the NF270 membrane resulted in total rejection in the region of 98% of biorefractory dissolved organic compounds at 80% recovery. The nanofiltration pre-treatment therefore provided a feedwater quality suitable for feed to the RO process unit 30.

The reverse osmosis ("RO") process unit 30 is constructed similarly to nanofiltration unit stage 20 but a different membrane, a polyamide membrane selected to have high salt rejection, is selected. Provision is made for use of biostatic agent, such as chloramines, to prevent or reduce the occurrence of fouling of the membrane and clean-in-place ("CIP") routine is implemented on a regular—but more or less conventional—basis to prevent fouling. Such routine cleaning is made possible through removal of the bulk of chlorine consuming rDOC at the nanofiltration stage 20. The RO process unit 30 performs desalination and allows production of a water stream that may be recycled to the pulp and paper mill with benefit for the process economics of that mill.

Modifications and variations to the water treatment process and plant of the present invention may be understood to the skilled reader of this disclosure. Such modifications and variations are deemed within the scope of the present invention.

The invention claimed is:

1. A process for treating a water stream containing dissolved organic carbon and dissolved salts including sulfate, comprising subjecting the water stream to a reverse osmosis treatment step to produce a treated water stream wherein, prior to treatment of water in the reverse osmosis step, the water stream is treated in a plurality of water stream pre-treatment steps to substantially reduce the amount of dissolved organic carbon and sulfate in said water stream, and directing said pre-treated water stream to the reverse osmosis step, said water stream pre-treatment steps comprising:
 i. an anaerobic process for reducing sulfate contained in said water stream to sulfide while producing biogas;
 ii. aeration of water directed from the anaerobic process; and
 iii. a membrane treatment step involving nanofiltration of water pre-treated by step (ii).

2. The process of claim 1, wherein the plurality of pre-treatment steps lower the concentration of the dissolved organic carbon that comprises lignin compounds or lignin derived compounds, in the water stream directed to the reverse osmosis step.

3. The process of claim 2, wherein said lignin compounds or lignin derived compounds have a high chlorine demand of about 1-2 mg chlorine demand per 1 mg of dissolved organic carbon.

4. The process of claim 3, wherein the amount of dissolved organic carbon in the nanofiltration treatment step is reduced up to 99%.

5. The process of claim 1, wherein the water is treated in two anaerobic reactors.

6. The process of claim 1, wherein the anaerobic process involves further treatment by a membrane bioreactor, which allows removal of a small portion of dissolved organic carbon, the remaining portion being predominantly intractable to anaerobic and aerobic microbial digestion processes.

7. The process of claim 1, wherein the water stream is an industrial water stream or a combination of a domestic wastewater stream with an industrial water stream.

8. The process of claim 7, wherein the industrial water stream is a stream from a pulp or paper mill.

9. The process of claim 1, wherein concentrates from the pre-treatment and the reverse osmosis steps are treated with coagulants or oxidants.

10. The process of claim 1, wherein concentrates from the pre-treatment and the reverse osmosis steps are treated by a further membrane treatment step or ion exchange including magnetic ion exchange.

11. The process of claim 1, wherein the nanofiltration comprises a plurality of stages comprising spiral wound membrane elements.

12. The process of claim 1, wherein said treated water stream is recycled.

13. The process of claim 12, wherein said treated water stream is recycled to an industrial plant.

14. The process of claim 13, wherein the industrial plant is a pulp or paper mill.

15. A water treatment plant for treating a water stream containing dissolved organic carbon and dissolved salts including sulfate comprising: (a) a reverse osmosis process unit; and (b) a plurality of pre-treatment units for undertaking a plurality of pre-treatment steps to reduce the concentration of dissolved organic carbon and sulfate in said water stream before directing said pre-treated water stream to the reverse osmosis process unit (a), wherein the pretreatment comprise:
 i. an anaerobic reactor for reducing sulfate contained in said water stream to sulfide while producing biogas;
 ii. one or more aeration basins for aeration of water directed from the anaerobic reactor; and
 iii. a nanofiltration process unit for removing the dissolved organic carbon from the water pre-treated with (ii) to produce a water quality acceptable for feed to the reverse osmosis process unit (a).

16. The water treatment plant of claim 15, wherein the pretreatment units reduce the concentration of dissolved organic carbon, wherein dissolved organic carbon comprises lignin compounds or lignin derived compounds in the water stream directed to the reverse osmosis stage.

17. The water treatment plant of claim 16, wherein said lignin compounds or lignin derived compounds have a high chlorine demand of about 1-2 mg chlorine demand per 1 mg of dissolved organic carbon.

18. The water treatment plant of claim 15, wherein concentrates from the pre-treatment and the reverse osmosis units are treated with coagulants or oxidants.

19. The water treatment plant of claim 15, wherein concentrates from the pre-treatment and the reverse osmosis units are treated by a further membrane treatment step or ion exchange including magnetic ion exchange.

20. The water treatment plant of claim 15, wherein the nanofiltration process unit comprises a plurality of concentrate stages comprising spiral wound membrane elements and said treated water stream is recycled.

21. The process of claim 11, wherein the spiral wound membrane elements are contained within pressure vessels.

22. The process of claim 21, wherein each of the pressure vessels contains 3-6 membrane elements.

23. The process of claim 22, wherein the nanofiltration comprises two or more concentrate stages, and in each concentrate stage, the pressure vessels are connected in parallel with respect to the direction of feed or concentrate flow.

* * * * *